US008964810B2

(12) United States Patent
Kottke et al.

(10) Patent No.: US 8,964,810 B2
(45) Date of Patent: Feb. 24, 2015

(54) FREQUENCY HOPPING METHOD FOR A RADIO DEVICE

(75) Inventors: Thomas Kottke, Ehningen (DE); Johannes Pittermann, Markdorf (DE)

(73) Assignee: EADS Deutschland GmbH, Ottobrunn (DE)

( * ) Notice: Subject to any disclaimer, the term of this patent is extended or adjusted under 35 U.S.C. 154(b) by 375 days.

(21) Appl. No.: 13/508,054

(22) PCT Filed: Oct. 29, 2010

(86) PCT No.: PCT/DE2010/001266
§ 371 (c)(1),
(2), (4) Date: Aug. 10, 2012

(87) PCT Pub. No.: WO2011/054338
PCT Pub. Date: May 12, 2011

(65) Prior Publication Data
US 2012/0300813 A1    Nov. 29, 2012

(30) Foreign Application Priority Data
Nov. 5, 2009    (DE) .......... 10 2009 052 107

(51) Int. Cl.
*H04B 1/00*    (2006.01)
*H04B 1/715*   (2011.01)
*H04B 1/7143*  (2011.01)

(52) U.S. Cl.
CPC .............. *H04B 1/715* (2013.01); *H04B 1/7143* (2013.01); *H04B 2001/7154* (2013.01)
USPC ........................................ 375/132

(58) Field of Classification Search
CPC .......... H04B 1/713; H04B 1/707; H04B 1/69; H04B 1/7143; H04B 2001/6908; G01S 19/21; G01S 19/215; G01S 7/36; H04K 1/003; H04K 3/25; H04L 1/02
USPC .......... 375/130, 132, 259, 295, 296, 316, 346
See application file for complete search history.

(56) References Cited

U.S. PATENT DOCUMENTS 3,781,818 A * 12/1973 Pardoe et al. ................. 370/538
5,430,659 A *  7/1995 Miller ........................... 702/124
5,483,695 A *  1/1996 Pardoen ........................ 455/314
(Continued)

FOREIGN PATENT DOCUMENTS

EP    1 717 962 A1    11/2006
EP    2 048 793 A1    4/2009
WO   WO 2007/075133 A1    7/2007

OTHER PUBLICATIONS

G. S. Biradar et al., "An Adaptive Frequency and Time Hopping PPM UWB for Multiple Access Communication", Information, Communication & Signal Processing 2007 6th International Conference, Dec. 10-13, 2007, (Six (6) pages).
(Continued)

*Primary Examiner* — Vineeta Panwalkar
(74) *Attorney, Agent, or Firm* — Crowell & Moring LLP

(57) ABSTRACT

A frequency hopping method for a radio device in which the signal to be transmitted is modulated onto an HF carrier and at least two of the following signal properties are varied in a pseudo-random manner during the transmission after one or more frequency hops: bandwidth, modulation type, and transmission duration of a frequency hop.

22 Claims, 5 Drawing Sheets

(56) References Cited

U.S. PATENT DOCUMENTS

| | | | |
|---|---|---|---|
| 5,623,312 A * | 4/1997 | Yan et al. | 375/240.16 |
| 5,832,026 A * | 11/1998 | Li | 375/136 |
| 6,029,265 A * | 2/2000 | Itoi et al. | 714/755 |
| 7,092,427 B1 | 8/2006 | Tollefson | |
| 8,060,028 B1 * | 11/2011 | Ho et al. | 455/78 |
| 2002/0021745 A1 | 2/2002 | Negus | |
| 2005/0215206 A1 * | 9/2005 | Granstrom et al. | 455/102 |
| 2007/0188373 A1 * | 8/2007 | Shirakawa et al. | 342/70 |
| 2008/0013599 A1 * | 1/2008 | Malladi | 375/132 |
| 2008/0117995 A1 * | 5/2008 | Anderson et al. | 375/260 |
| 2008/0298434 A1 | 12/2008 | Nyberg et al. | |
| 2009/0080498 A1 * | 3/2009 | Deisher et al. | 375/136 |
| 2009/0180521 A1 * | 7/2009 | Joseph et al. | 375/148 |

OTHER PUBLICATIONS

Ming Lei et al., "Reliable Adaptive Modulation and Interference Mitigation for Mobile Radio Slow Frequency Hopping Channels", IEEE Transactions on Communications, Mar. 2008, pp. 352-355, vol. 56, No. 3.

International Search Report including English language translation dated Feb. 18, 2011 (Six (6) pages).

* cited by examiner

FREQUENCY HOPPING METHOD FOR A RADIO DEVICE

BACKGROUND AND SUMMARY OF THE INVENTION

Exemplary embodiments of the present invention relate to a frequency hopping method for a radio.

Radios that use a frequency hopping method are common knowledge today. This method is used to reduce transmission errors (for example as a result of fading) and also to prevent the transmitted information (voice or data) from being recovered by unauthorized third parties. However, known receivers can already be used to record the individual hops in these frequency hopping methods over a wide band and then to recover the information contained in the signal using classification methods ("de-hopping").

Exemplary embodiments of the present invention are directed to a method that can be used to prevent this recovery of information from the received signal.

According to exemplary embodiments of the present invention, the individual frequency hops involve one or more of the following signal parameters being changed on a pseudo random basis:

1. Switching between different, related or unrelated, modulation types (e.g. QPSK, FSK, ASK, FM, . . . ).
2. Switching the bandwidth. In order to be able to switch between different bandwidths, it is advantageous for supplementary data to be inserted for the useful data at higher bandwidths. This can be accomplished using of one of the following alternatives:
    - oversampling the signal when transmitting analog data, such as voice—this also guarantees constant or better robustness towards transmission errors on account of the inserted redundancy;
    - multiplying the useful data when transmitting digital useful data—this likewise guarantees constant or better robustness toward transmission errors on account of the inserted redundancy;
    - inserting an information sequence that is known to the receiver, for example a pseudo random bit sequence (e.g. pseudo noise (PN) sequences) or bits of an error recognition code or error correction code (e.g. CRC or parity)—these additional bits can also be used by the receiver in order to correct transmission errors using mathematical methods. Furthermore, this makes it more difficult for a potential (unauthorized) eavesdropper to identify the actually transmitted data (useful data). The bandwidth is obtained from the modulation type and the symbol rate. The quantity of supplementary bits required for setting the desired bandwidth is obtained from the modulation alphabet and the clock rate of the modulator.

The supplementary data (supplementary bits) can be positioned in the overall data stream by means of one of the following alternatives:
    - inserting the supplementary data after the useful data—in this case, however, the useful data can be extracted relatively easily by unauthorized third parties;
    - alternately stringing together useful data and supplementary data, i.e. n bits of useful data, z bits of supplementary data, n bits of useful data, z bits of supplementary data, etc., the parameters n and z being prescribed by the controller and being able to change dynamically during the transmission in a further embodiment of the invention;
    - inserting the supplementary data in accordance with the two alternatives above plus additional interleaving, i.e. pseudo randomly permuting, the overall data in order to hamper or prevent extraction of the useful data by unauthorized third parties.

In a further form of the invention, the bandwidth can also be varied by virtue of the data being transmitted either in a relatively short or a relatively long transmission period for a hop, with a relatively short hop transmission period producing a relatively high bandwidth and a relatively long hop transmission period producing a relatively low bandwidth. This requires no supplementary data to be inserted into the signal. However, a correlation between bandwidth and transmission period must be accepted.

3. Varying the transmission period of a hop, wherein in one specific embodiment the pause period between the individual hops can additionally be varied as a further parameter. In this case, supplementary data can also be inserted for the useful data, with the methods cited above being able to be used, in principle.

The changes to said signal parameters are advantageously made during the switching times of the frequency switching and therefore apply for the entire duration of a hop.

The signal parameters can be changed for each new hop, but this is not necessary. By way of example, provision may also be made for a change to be made only for each second or third hop. Clearly, any other sequences of hops at which changes are meant to be made are also possible in this case. Pseudo random change patterns are likewise advantageous in this context in order to hamper classification.

As a particular advantage, the following changes to signal properties are combined with one another:

a) changing the modulation type and changing the bandwidth.

b) changing the modulation type and changing the transmission period of a frequency hop—in addition to changing the transmission period, it is also possible for the pause period between two directly successive frequency hops to be combined with changing the modulation type.

c) changing the bandwidth and changing the transmission period of a frequency hop—in addition to changing the transmission period, it is also possible for the pause period between two directly successive frequency hops to be combined with changing the bandwidth.

The switching between the individual modulation types and the bandwidths and the adjustment of the transmission period of a hop are effected using a pseudo random pattern that can be generated using a key generator, for example (for example using a linear feedback shift register). This pattern needs to be the same for the transmitter and the receiver and is advantageously chosen such that correlations between modulation type, bandwidth, transmission period of the hop and frequency range are minimized.

Without limiting the general nature, the method according to the invention can be used not only for transmitting voice but also for general data transmission (any bit streams).

The invention has the following advantages:
    Avoidance of de-hopping and of consequently possible decoding of the signal using the parameters signal bandwidth, power density distribution or modulation type. As a result, potential de-hopping now has only the direction (and possibly also the signal strength) available as a single selection criterion. However, as soon as the frequency hopping range of the transmitter is larger than the scanning bandwidth of a direction finder, then although the direction of the individual transmission packets could be determined they would at best be perceived as various bursts from a particular direction.

Modulation type recognition units require a certain time in order to robustly recognize a modulation type. Although technological progress means that this period of time is becoming increasingly shorter, a rapid change—as made possible with the method according to the invention—makes recognition impossible while the (arbitrarily adjustable) transmission period of the frequency hop is shorter than the time required for recognition.

The high dimensionality of the adjustable parameters hampers the entry of such a radio in an emitter database or makes it impossible. This in turn hampers or makes impossible automatic identification of the radio.

It is not possible to make out explicitly how many radios/transmissions there are.

BRIEF DESCRIPTION OF THE DRAWING FIGURES

The invention is explained in more detail using specific exemplary embodiments with reference to figures, in which.

DETAILED DESCRIPTION

Figure 1:
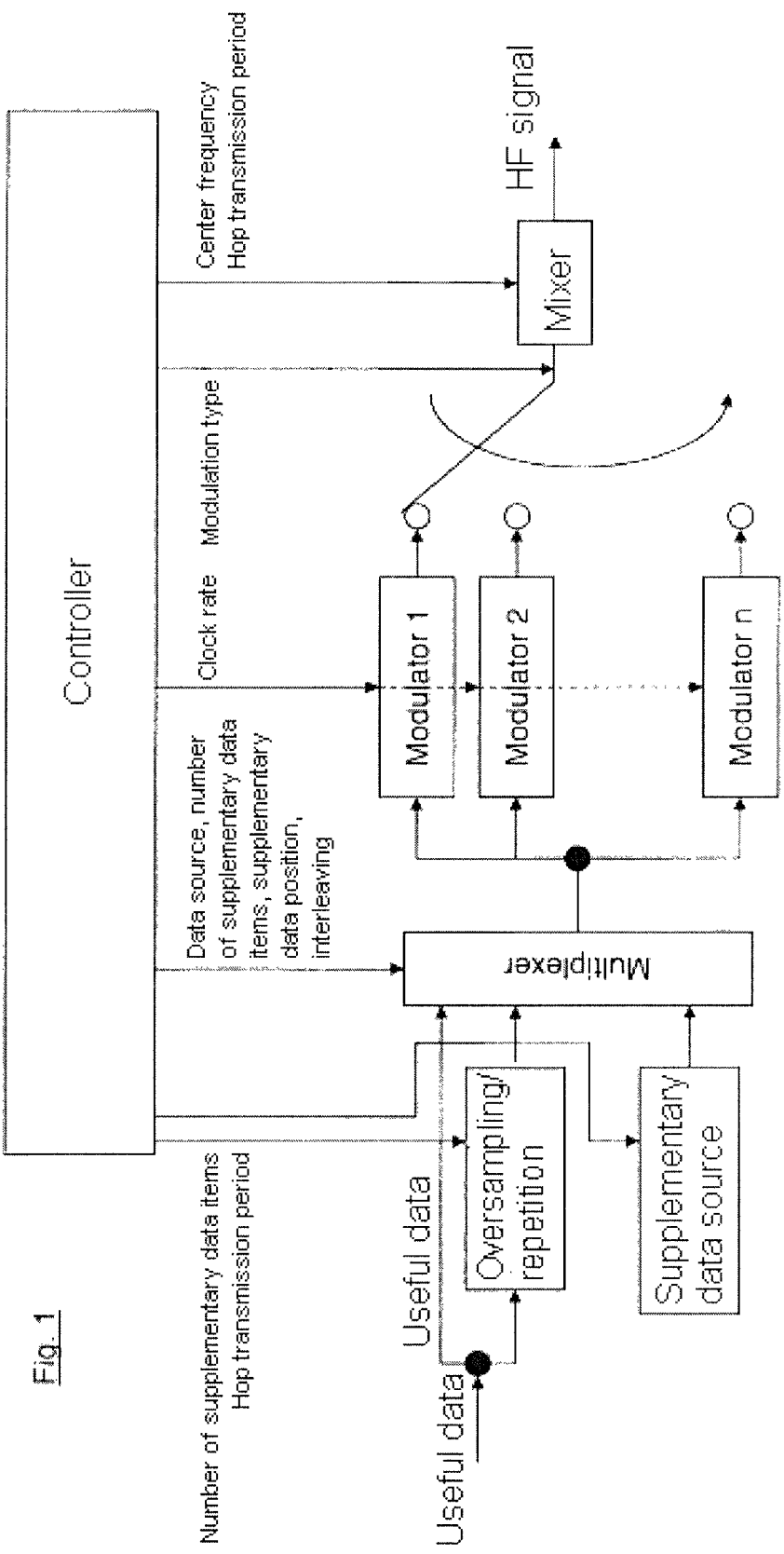
FIG. 1 shows the signal flow in the transmitter in accordance with a first embodiment of the method according to the invention.

FIG. 1 illustrates the signal flow in the transmitter. Additional bits are inserted into the useful data (digitized voice signal, binary data) from a supplementary data source (for example generated pseudo random bits) or by producing repetitions of the useful data or by oversampling, depending on the current bandwidth and the modulation type used. The useful data and supplementary data are distributed in the data stream on the basis of the positions or interleaving matrices prescribed by the controller. Next, the data stream extended in this manner is forwarded via a multiplexer to all modulators (one modulator per modulation type) in parallel, which produce IQ data in baseband. In line with the currently prescribed modulation type, however, only one of the modulator output signals is passed to a mixer by means of a switch. This mixer modulates the IQ data in line with the center frequency of the current hop into the prescribed RF band. As a result, the useful data to be transmitted are therefore modulated onto an RF carrier. The controller controls the signal production and provides the cited components with the parameters which are required for hop production. As can be seen from FIG. 1, the controller also provides the modulators with the signal clock, as this is required for varying the signal bandwidth.

In the receiver, the received signal is down-converted to baseband in light of the hop control described in FIG. 1 and is demodulated by the prescribed demodulator. The useful data are extracted from the inserted supplementary data on the basis of the pattern. In this context, the inserted supplementary data can also be used to be able to determine the useful data more robustly.

In a further embodiment, which is not shown, the modulators can be driven in parallel (in this respect in an identical manner to FIG. 1). The baseband signals produced by each of the modulators are added and the sum signal is up-converted to the intended RF frequencies. In this context, it is advantageous if the individual baseband signals have different IF frequencies in order to simulate a plurality of radios in the RF signal for an unauthorized receiver.

Figure 2:
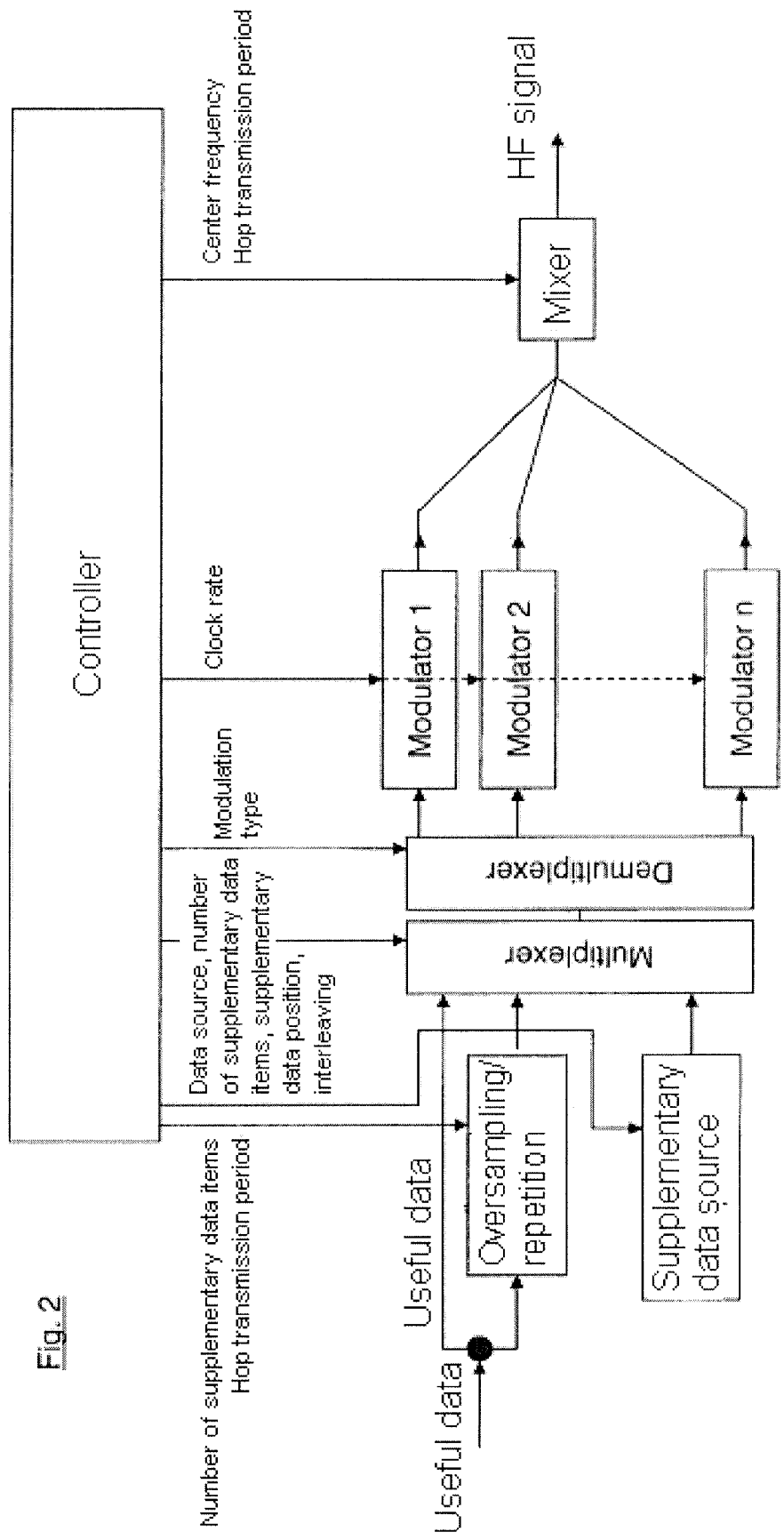
FIG. 2 shows the signal flow in the transmitter in accordance with a second embodiment of the method according to the invention.

FIG. 2 shows the signal flow in the transmitter for a further embodiment of the method according to the invention. The difference in respect of the embodiment shown in FIG. 1 is based on the data stream (useful data and possibly supplementary data inserted therein) shown in FIG. 2 being supplied not to all modulators in parallel but rather only to the modulator that is currently intended for producing the modulation. This is accomplished with an additional demultiplexer connected downstream of the multiplexer and which forwards the output signal from the multiplexer only to the respectively active modulator. The remainder of the modulators are deactivated.

Instead of one modulator for each modulation type, a further embodiment may also involve the provision of a universal modulator that is able to produce all required modulation types.

Figure 3:
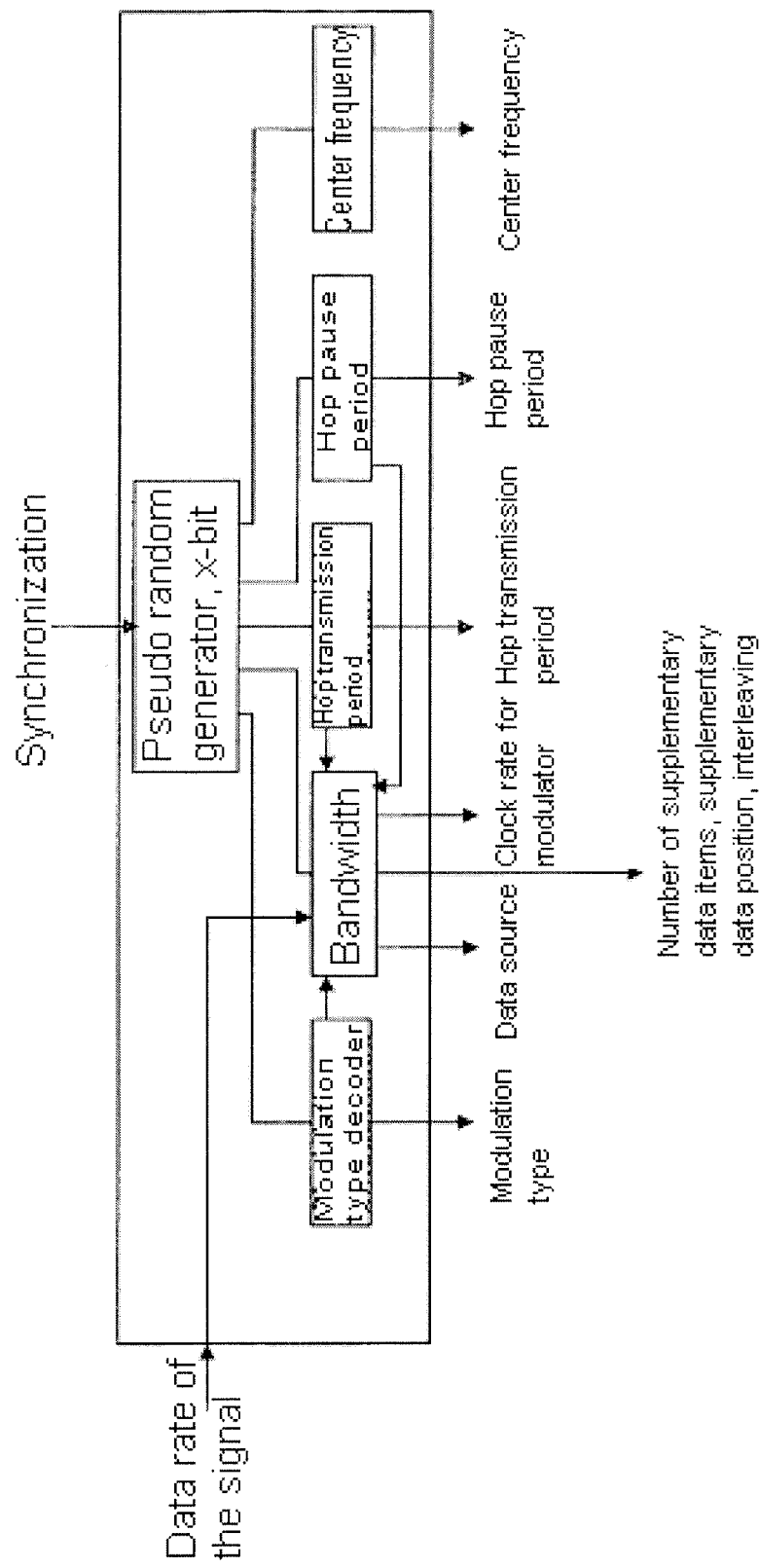
FIG. 3 shows the control logic for the inventive variation of the signal parameters in the radio.

FIG. 3 shows the control logic for switching the individual signal parameters, as implemented in the controller (FIGS. 1 and 2). In this case, a pseudo random generator (e.g. in the form of a 16-bit linear feedback shift register) is used to actuate a decoder for the modulation type switching, a decoder for the bandwidth switching, a decoder for the hop transmission period switching, a decoder for the hop pause period switching and a decoder for switching the center frequency, respectively. It should be noted here that the decoder for the bandwidth switching requires the data rate of the original signal, the modulation type, the hop transmission period and the hop pause period as further inputs. The respective output signal from the decoders is, as described in FIGS. 1 and 2, used to control the signal flow in the transmitter. The control logic shown in FIG. 3 is in sync with the control logic provided in the reception appliance, which will be explained in more detail further below.

By way of example, the individual decoders can be actuated by virtue of individual bits from the pseudo random generator being used exclusively for actuating a particular decoder, e.g.:

bits Nos. 1 to 4 for actuating the modulation type decoder, bits Nos. 5 and 6 for actuating the bandwidth decoder, etc.

For the number of bits required, the following applies, for example:

Number of bits per decoder=$\log_2$ (number of possible states, e.g. number of modulation types or number of bandwidths, etc.), rounded up to an integer.

Alternatively, it is also possible for individual outputs (bits) of the pseudo random generator to be used for a plurality of decoders, but this can result in an undesirable correlation between the parameters that are to be varied.

In order to process the transmitted signals produced on the basis of the frequency hopping method according to the invention and to arrive at the useful data contained therein, the operating parameters switched on a pseudo random basis during transmission need to be exactly simulated and adjusted in the receiver. To this end, first it is necessary for synchronization to occur between radio and radio receiver. This can be effected by a training or synchronization sequence (bit pattern) and/or a pulse pattern, which are exchanged between transmitter and receiver (handshake) on a user-defined (adjustable) channel prior to the actual transmission.

Depending on the signal properties produced during transmission, reception of the signal involves the following methods being used to extract the useful data:

1. Switching the modulation type: a switch is made to the relevant demodulator in line with the modulation type used during transmission, e.g. (QPSK, FSK, ASK, FM, . . . ).

2. Switching the bandwidth: in order to be able to decode the data, it is necessary to filter out the added supplementary data from the transmitted data in the case of relatively high bandwidths. This can be accomplished particularly by means of one of the following alternatives:

undersampling the (analog) signal;

using the known inserted (digital) information sequence to correct transmission errors at bit level and to parameterize the equalizer (using Channel estimation). The volume of supplementary data to be filtered out is obtained from the modulation alphabet and the clock rate of the modulator.

Filtering the (analog) voice signal in order to improve the voice quality in the case of noisy transmission.

If the bandwidth has been varied in the transmitter such that the data have been transmitted either in a relatively short or in a relatively long hop transmission period, no supplementary data need to be inserted into the signal. The hop transmission period needs to be parameterized in the receiver by the controller accordingly.

3. Varying the transmission period of a hop: in this case it may also be necessary to remove supplementary data, with the methods cited above being able to be used, in principle.

Figure 4:
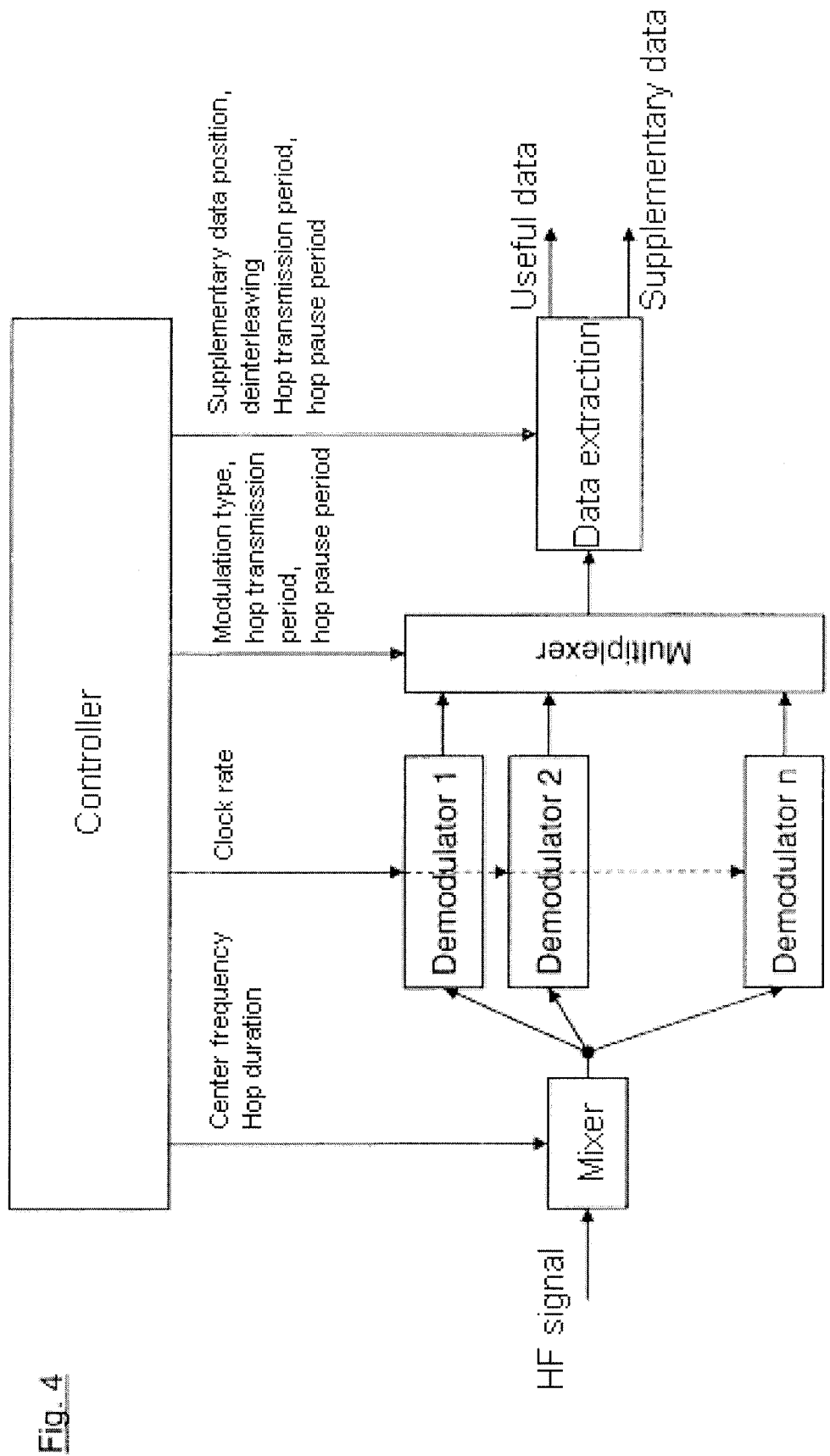
FIG. 4 shows the signal flow in the receiver on the basis of the method according to the invention.

FIG. 4 shows the signal flow in the receiver on the basis of an embodiment of the method according to the invention.

When the signal is received, the signal down-converted to baseband by a mixer is advantageously routed to a plurality of demodulators in parallel. The demodulators correspond to the possible modulation types for the transmitted signal. Next, a multiplexer selects the data stream from the demodulator that is respectively required at this time and supplies it to the further signal processing.

Alternatively, the down-converted signal can be switched directly to the currently required demodulator, as a result of which the multiplexer connected downstream of the demodulators is not required.

In each of the two alternatives cited, the output signal from the currently required demodulator is subsequently subjected to data extraction. This involves removing the supplementary bits inserted during the transmission. If the method of oversampling has been chosen to increase the bandwidth during transmission, the signal can in this case be undersampled in accordance with the oversampling factor. An advantage in this context is integer oversampling during transmission, as this allows the additional samples to be easily sorted out during reception. If error detection bits or error correction bits have been inserted as supplementary bits to increase the bandwidth, these can be used for error recognition or avoidance when they have been extracted.

Figure 5:
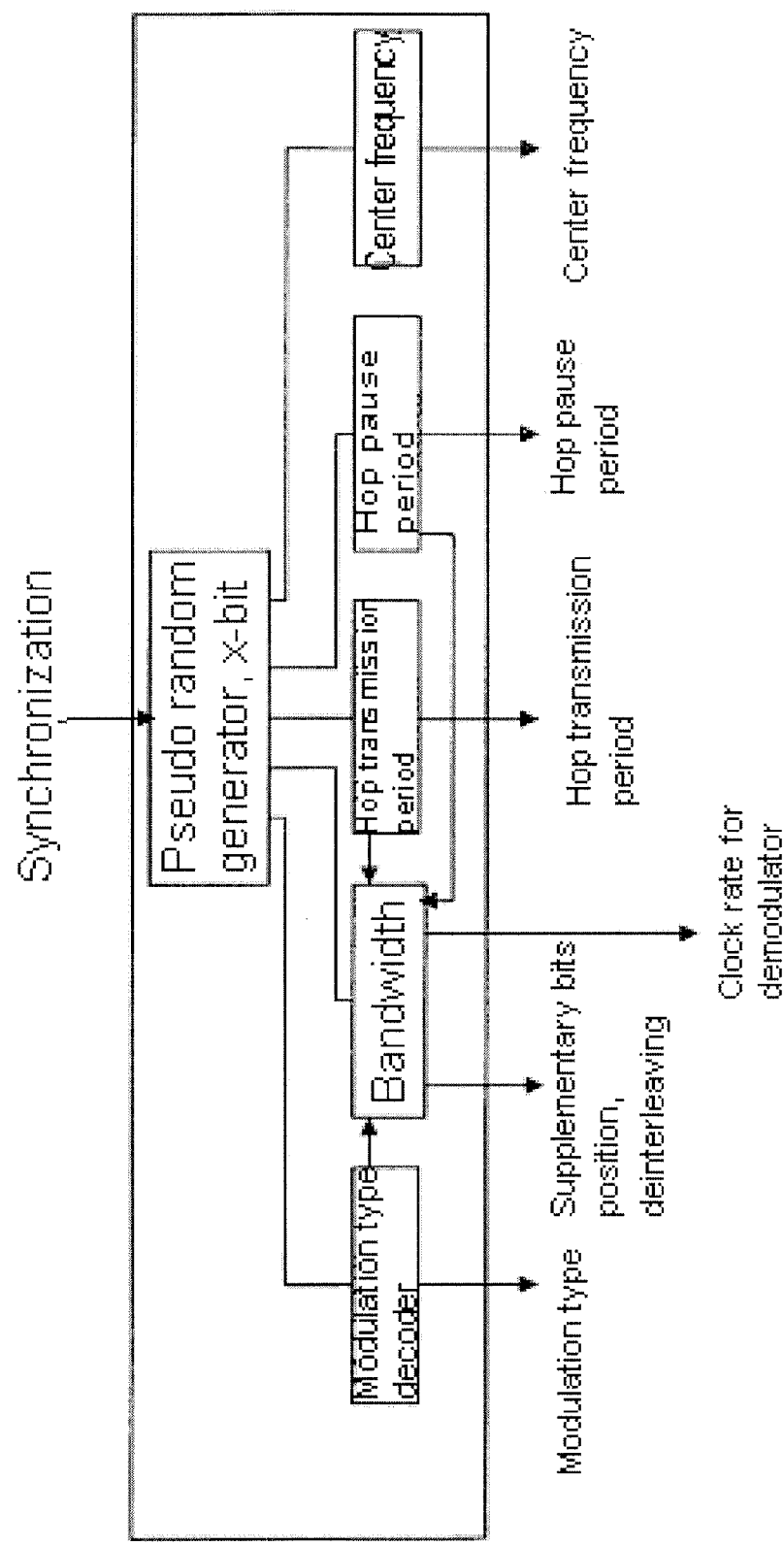
FIG. 5 shows the control logic for the inventive variation of the signal parameters in the reception appliance.

FIG. 5 shows the control logic for the inventive variation of the signal parameters in the reception appliance. The control logic corresponds to the controller of the radio as shown in FIG. 3. So that the correct operating parameters, which are required on the basis of the current signal properties of the received signal, can be adjusted during reception, the controllers in the radio and in the reception appliance need to be synchronized to one another. By way of example, this can be accomplished by applying a training or synchronization sequence (bit pattern) and/or a pulse pattern to the pseudo random generators in the radio and reception appliance prior to the transmission.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A frequency hopping method for a radio, comprising:
   modulating a signal onto a radio frequency (RF) carrier to generate an RF signal and transmitting the RF signal;
   varying, for a subsequent signal of a subsequent transmission following one or more frequency hops, at least two of the following signal properties on a pseudo random basis
   bandwidth,
   modulation type,
   transmission period of a frequency hop,
   transmitting the subsequent signal with the varied at least two signal properties,
   wherein a respective modulator produces individual modulation types, wherein the signal to be modulated is supplied to all of the respective modulators in parallel, and wherein output signals from the respective modulators are added and these signals have different intermediate frequencies.

2. The method as claimed in claim 1, wherein a change to the bandwidth or to the transmission period of the frequency hop involves adding supplementary data to useful data in the subsequent signal.

3. The method as claimed in claim 2, wherein supplementary data are added by multiplying the useful data.

4. The method as claimed in claim 2, wherein supplementary data are added by oversampling the subsequent signal.

5. The method as claimed in claim 2, wherein supplementary data are added by inserting pseudo random information.

6. The method as claimed in claim 2, wherein the supplementary data are inserted into a data stream of the subsequent signal as a block after the useful data.

7. The method as claimed in claim 2, wherein the supplementary data are inserted into a data stream of the subsequent signal alternately with the useful data based on a repeated scheme of n bits of useful data followed by z bits of supplementary data, where n and z are integers.

8. The method as claimed in claim 7, wherein the parameters n and z are dynamically changed during the transmission.

9. The method as claimed claim 2, wherein following addition of the supplementary data, overall data comprising the supplementary data and the useful data are permuted in accordance with an interleaver matrix.

10. The method as claimed in claim 2, wherein the supplementary data are added by inserting bits of an error recognition code or error correction code.

11. The method as claimed in claim 1, wherein the bandwidth is changed by changing the transmission period of the frequency hop.

12. A frequency hopping method for a radio, comprising:
   modulating a signal onto a radio frequency (RF) carrier to generate an RF signal and transmitting the RF signal;
   varying, for a subsequent signal of a subsequent transmission following one or more frequency hops, at least two of the following signal properties on a pseudo random basis bandwidth,
modulation type,
transmission period of a frequency hop,
transmitting the subsequent signal with the varied at least two signal properties, wherein a respective modulator produces individual modulation types, wherein the subsequent signal to be modulated is supplied only to that modulator which is used for a current frequency hop, wherein a pseudo random generator actuates at least two of the following decoders a decoder for changing the modulation type,
a decoder for changing the bandwidth, to which a data rate of the subsequent signal, the transmission period of the frequency hop, a pause period between two directly successive frequency hops and the modulation type are supplied as further input variables,
a decoder for changing the transmission period of the frequency hop,
a decoder for changing a center frequency of the subsequent signal.

13. The method as claimed in claim 12, wherein particular output bits from the pseudo random generator are associated exclusively with a particular decoder.

14. The method as claimed in claim 12, wherein particular output bits from the pseudo random generator are associated with a plurality of decoders.

15. A method for receiving a frequency hopping signal by a receiver, comprising:
receiving a transmitted frequency hopping signal;
adjusting reception properties of the receiver corresponding to a known pseudo random variation of at least two of the signal properties of the transmitted signal:
bandwidth,
modulation type,
transmission period of a frequency hop,
wherein the receiver is in sync with a transmitter of the transmitted frequency hopping signal, wherein a respective demodulator demodulates individual modulation types, wherein the received signal to be demodulated is supplied to all of the respective demodulators in parallel, and wherein output signals from the respective demodulators have different intermediate frequencies.

16. The method as claimed in claim 15, wherein a change to the bandwidth or to the transmission period of the frequency hop involves filtering out supplementary data.

17. The method as claimed in claim 16, wherein the filtered supplementary data are used to correct transmission errors on the basis of redundancy contained in the supplementary data.

18. The method as claimed in claim 16, wherein the filtered supplementary data are used for channel estimation and to adjust an equalizer for correcting channel fading effects.

19. The method as claimed in claim 16 wherein prior to the filtering out of the supplementary data, data in an overall data stream are permuted in accordance with a deinterleaver matrix.

20. The method as claimed in claim 16, wherein the supplementary data are filtered out during transmission of analog signals by undersampling.

21. The method as claimed in claim 20, wherein samples of the supplementary data are used to improve a voice signal perturbed by transmission errors, using filters.

22. A method for receiving a frequency hopping signal by a receiver, comprising:
receiving a transmitted frequency hopping signal;
adjusting reception properties of the receiver corresponding to a known pseudo random variation of at least two of the signal properties of the transmitted signal:
bandwidth,
modulation type,
transmission period of a frequency hop,
wherein the receiver is in sync with a transmitter of the transmitted frequency hopping signal, wherein a respective demodulator demodulates individual modulation types, wherein the received signal to be demodulated is supplied only to that demodulator which is used for a current frequency hop, wherein a pseudo random generator actuates at least two of the following decoders a decoder for changing the modulation type,
a decoder for changing the bandwidth, to which a data rate of the subsequent signal, the transmission period of the frequency hop, a pause period between two directly successive frequency hops and the modulation type are supplied as further input variables,
a decoder for changing the transmission period of the frequency hop,
a decoder for changing a center frequency of the subsequent signal.

* * * * *